United States Patent
Hansen et al.

(10) Patent No.: US 12,436,136 B2
(45) Date of Patent: Oct. 7, 2025

(54) DEVICE FOR THE DETECTION OF CONDITIONS INDICATIVE OF ILLICIT DRUG PRODUCTION

(71) Applicant: P Alert Limited, Te Awamutu (NZ)

(72) Inventors: James Hansen, Te Awamutu (NZ); Bharath Bhaskar Atreya, Bangalore (IN); Ashwath Maiya, Bangalore (IN)

(73) Assignee: P Alert Limited, Te Awamutu (NZ)

( * ) Notice: Subject to any disclaimer, the term of this patent is extended or adjusted under 35 U.S.C. 154(b) by 0 days.

(21) Appl. No.: 18/591,824

(22) Filed: Feb. 29, 2024

(65) Prior Publication Data
US 2024/0201155 A1 Jun. 20, 2024

Related U.S. Application Data

(63) Continuation-in-part of application No. 16/472,589, filed as application No. PCT/NZ2017/050170 on Dec. 21, 2017, now abandoned.

(51) Int. Cl.
G01N 33/00 (2006.01)
(52) U.S. Cl.
CPC ..... *G01N 33/0047* (2013.01); *G01N 33/0059* (2013.01)
(58) Field of Classification Search
CPC ........... G01N 33/0047; G01N 33/0059; G01N 33/0063
See application file for complete search history.

(56) References Cited

U.S. PATENT DOCUMENTS

| | | | | |
|---|---|---|---|---|
| 8,860,579 B1 * | 10/2014 | Alouani | ................. | G08B 21/14 340/632 |
| 9,241,054 B1 | 1/2016 | Roberts | | |
| 2003/0020618 A1 * | 1/2003 | Hemmer | ........... | G01N 33/0047 340/632 |
| 2003/0192781 A1 * | 10/2003 | Kiesele | ................ | G01N 33/005 204/431 |

(Continued)

OTHER PUBLICATIONS

Anrai Detection Limited, "How it Works, Nov. 11, 2016 online at: https://web.archive.org/web/20161111142213/http://www.methminder.co.nz/how-it-works/".

*Primary Examiner* — Amine Benlagsir
(74) *Attorney, Agent, or Firm* — GableGotwals (57) ABSTRACT

Devices and methods for the detection of conditions indicative of production and/or use of methamphetamine hydrochloride are disclosed. The device comprises a self-contained power source, and an airborne sensor configured to output a signal indicative of the presence of methamphetamine hydrochloride. At least one processor is configured to maintain the device in a low power sleep mode until a predetermined time condition is met. On the time condition being met, the airborne sensor is preheated for a first period of time and the signal output by the airborne sensor is monitored. On determining that the signal output by the airborne sensor meets a predetermined threshold the airborne sensor is preheated for a second period of time, wherein the second period of time is longer than the first period of time, on determining that the signal output by the airborne sensor meets the predetermined threshold following the preheating for the second period of time, an alert is transmitted to a remote location.

17 Claims, 7 Drawing Sheets

(56) References Cited

U.S. PATENT DOCUMENTS

| | | | |
|---|---|---|---|
| 2006/0219937 A1* | 10/2006 | Henry | G01N 21/658 |
| | | | 250/425 |
| 2007/0056388 A1* | 3/2007 | Henry | G01N 21/658 |
| | | | 73/864.34 |
| 2007/0139183 A1* | 6/2007 | Kates | G08B 25/005 |
| | | | 340/539.22 |
| 2007/0167853 A1* | 7/2007 | Melker | A61B 5/411 |
| | | | 600/529 |
| 2008/0204757 A1* | 8/2008 | Manning | G01N 21/1702 |
| | | | 356/451 |
| 2009/0318846 A1* | 12/2009 | Prausnitz | A61B 17/3203 |
| | | | 606/41 |
| 2012/0315705 A1 | 12/2012 | Allyn | |
| 2015/0164391 A1* | 6/2015 | Hernandez-Rosas | |
| | | | H04W 52/0277 |
| | | | 600/365 |
| 2016/0063833 A1* | 3/2016 | Schultz | G08B 19/00 |
| | | | 340/522 |
| 2016/0097731 A1* | 4/2016 | Usagawa | G01N 27/12 |
| | | | 73/31.06 |
| 2017/0155429 A1* | 6/2017 | Hung | H04W 4/80 |

* cited by examiner

DEVICE FOR THE DETECTION OF CONDITIONS INDICATIVE OF ILLICIT DRUG PRODUCTION

CROSS-REFERENCES TO RELATED APPLICATIONS

This application is a continuation-in-part of U.S. patent application Ser. No. 16/472,589, filed Jun. 21, 2019 which is hereby incorporated herein by reference, which in turn claims the benefit of: PCT Application Ser. No. PCT/NZ2017/050170, filed Dec. 21, 2017 which is hereby incorporated herein by reference; and New Zealand Patent Application No. 727847, filed Dec. 22, 2016 which is hereby incorporated herein by reference.

TECHNICAL FIELD

The present disclosure relates to a device for the detection of conditions indicative of illicit drug production, more particularly to detect conditions indicative of the production of methamphetamine.

BACKGROUND

The production of illicit drugs such as methamphetamine (also commonly known as "meth" or "P") is increasingly being performed in rental properties. This results in these properties becoming contaminated by the organic solvents, acids, alkalis and other chemicals used in, and produced by, the production process. This presents a significant health risk to subsequent residents of such contaminated properties.

Further, there is a significant economic cost to the owners of such properties in the testing for contamination, and subsequent decontamination if required. In addition to the actual costs of carrying out these processes, there is also an opportunity cost in terms of lost rental income during this time— along with the stigma of a property having previously been used as a drug lab to the point of needing decontamination.

Sensing units for the detection of indicators of methamphetamine production are known—however have practical limitations which may reduce their effectiveness. In particular, It is an object of the present invention to address the foregoing problems or at least to provide the public with a useful choice.

Further aspects and advantages of the present invention will become apparent from the ensuing description which is given by way of example only.

SUMMARY OF THE DISCLOSURE

According to an aspect of the present technology there is provided a device for the detection of conditions indicative of production and/or use of methamphetamine hydrochloride, comprising: a self-contained power source; an airborne sensor configured to output a signal indicative of the presence of methamphetamine hydrochloride; at least one processor, configured to: maintain the device in a low power sleep mode until a predetermined time condition is met; preheat the airborne sensor for a first period of time and monitor the signal output by the airborne sensor; preheat the airborne sensor for a second period of time on determining that the signal output by the airborne sensor meets a predetermined threshold, wherein the second period of time is longer than the first period of time, and monitor the signal output by the airborne sensor; and on determining that the signal output by the airborne sensor meets the predetermined threshold following the preheating for the second period of time, transmit an alert to a remote location.

In examples, the airborne sensor may comprise a semiconductor type airborne sensor. In examples, the airborne sensor may comprise a metal oxide type airborne sensor.

In examples, the first period of time may be between about 5 seconds and about 10 seconds. In examples the first period of time may be about 6 seconds.

In examples, the second period of time may be greater than about 10 seconds. In examples, the second period of time may be between about 10 seconds and about 30 seconds. In examples the second period of time may be about 20 seconds.

In examples, the processor may be configured to perform an installation heating of the airborne sensor for a period of time greater than 2 minutes and less than 5 minutes. In examples, the processor may be configured to perform an installation heating of the airborne sensor for a period of time of about 3 minutes.

In examples, the device may comprise at least one interference sensor configured to output a signal indicative of physical interference with the device, wherein the at least one processor may configured to interrupt the low power sleep mode on receiving a signal indicative of physical interference with the device from the at least one interference sensor.

In examples the device may comprise a wireless modem configured to communicate over a cellular network. In examples the device may comprise a multi-carrier SIM, and the at least one processor may be configured to perform dynamic identification and locking of a designated cellular network.

In examples the processor may be configured to listen for command messages once the predetermined time condition is met.

In examples the predetermined time condition may be lapsing of a predetermined time interval. In examples the time interval may be between about 20 minutes and about 60 minutes. In examples the time interval may be between about 25 minutes and about 40 minutes. In examples the time interval may be about 30 minutes.

According to an aspect of the present technology there is provided a system for the monitoring and reporting of conditions indicative of production and/or use of methamphetamine hydrochloride, comprising: a device substantially as described herein; and a remote computing resource configured to be in communication with the device, wherein the remote computing resource is further configured to deliver alert messages, and/or enable access to a user interface displaying historical information relating to operation of the device, to at least one user.

According to an aspect of the present technology there is provided a method for the detection of conditions indicative of production and/or use of methamphetamine hydrochloride, comprising: maintaining a device comprising a self-contained power source and an airborne sensor configured to output a signal indicative of the presence of methamphetamine hydrochloride in a low power sleep mode until a predetermined time condition is met a self-contained power source; preheating the airborne sensor for a first period of time and monitoring the signal output by the airborne sensor; preheating the airborne sensor for a second period of time on determining that the signal output by the airborne sensor meets a predetermined threshold, wherein the second period of time is longer than the first period of time, and monitoring the signal output by the airborne sensor; and transmitting an alert to a remote location on determining that the signal output by the airborne sensor meets the predetermined threshold following the preheating for the second period of time.

According to an aspect of the present technology there is provided a device for the detection of conditions indicative of illicit drug production, comprising: an airborne ethanol sensor circuit configured to output a signal indicative of airborne ethanol concentration; a processor coupled to the airborne ethanol sensor circuit, configured to: receive the signal indicative of airborne ethanol concentration; determine whether a value of the signal exceeds a predetermined threshold; a communication circuit coupled to the processor, configured to send a message to at least one remote address on determination of the value of the signal exceeding the predetermined threshold.

According to an aspect of the present technology there is provided a method for the detection of conditions indicative of illicit drug production, comprising: driving an airborne ethanol sensor circuit to output a signal indicative of airborne ethanol concentration; receiving the signal indicative of airborne ethanol concentration at a processor; determining whether a value of the signal exceeds a predetermined threshold; and sending a message to at least one remote address on determination of the value of the signal exceeding the predetermined threshold.

In an exemplary embodiment, the device may be powered by a self-contained power source, for example a battery. This may enable the device to be positioned at any desired location within the property without reliance on connection to mains power supply. It may be desirable to reduce power consumption of the device, and therefore longevity of the battery without replacement or recharging, in order to enable a battery of a smaller capacity (and therefore smaller physical footprint) to be used.

Ethanol is used in significant quantities in the manufacture of many illicit drugs, comprising methamphetamine, and as such it is envisaged that detection of may be used as a reliable indicator of the early stages of a clandestine drug laboratory operating in the premises in which the device is installed— or at least activity within the premises requiring investigation by the property owner or manager. In an exemplary embodiment, the airborne ethanol sensor circuit may comprise a gas ethanol sensor.

In an exemplary embodiment, the ethanol sensor may be a metal oxide type gas sensor. By way of example, the gas ethanol sensor may be a tin oxide ($SnO_2$) sensor such as the MQ3 gas ethanol sensor manufactured by a variety of entities. It is envisaged that such metal oxide based sensors may achieve a desired degree of accuracy within the ethanol concentration levels required, while also having a compact package and relatively low power consumption.

In an exemplary embodiment, the airborne ethanol sensor circuit may be coupled to a sensor driving circuit. In an exemplary embodiment, the sensor driving circuit may be configured to deliver a pulse power up voltage to the gas ethanol sensor to heat the sensor prior to a reading of the sensor being taken. Such a pulse power up voltage delivers pulses of higher current to the resistive element of the sensor, with the higher current heating the resistive element while the pulsing maintains a similar overall power consumption rate in comparison with heating the element with a continuous voltage at a lower current. Many gas ethanol sensors, particularly metal oxide type sensors, require preheating of the sensor before a stable measurement can be achieved. By providing a pulse power up voltage, it has been identified that the preheating time may be reduced (from a recommended time of 24 hours for the MQ3 sensor to about 1 minute) with a tolerable degradation of measurement accuracy (in the order of +/−15%). In doing so, readings may be obtained at large intervals with reduced power consumption.

In an exemplary embodiment, the airborne ethanol sensor circuit may provide a high ohmic burden on the output of the gas ethanol sensor. It is envisaged that this may result in a lower precision in the readings (essentially by reducing the voltage range from which ADC readings are obtained), but lower current draw may assist with reducing power consumption.

In an exemplary embodiment, the processor may be programmed to take periodic readings at any desired time interval, for example from every few minutes, to days, or weeks. In exemplary embodiments, the processor may be configured to control the sensor driving circuit to preheat the sensor prior to taking a reading— whether using the pulse power up as described above, or a constant voltage power up over a longer period of time.

In an exemplary embodiment, the predetermined threshold for comparison with the value of the signal may be indicative of the airborne ethanol ($C_2H_5OH$) concentration being above about 75 ppm. It is envisaged that this threshold may avoid triggering of an alert in common household activity such as cleaning using rubbing alcohol or drinking alcohol consumption. It should be appreciated that this value is not intended to be limiting to all exemplary embodiments, as it is envisaged that in an exemplary embodiment the predetermined threshold may be above about 60 ppm. In an exemplary embodiment, the predetermined threshold may be above about 100 ppm.

In an exemplary embodiment, the communication circuit may comprise a wireless modem configured to communicate over a cellular network. For example, the wireless modem may be a GSM modem configured to operate using a SIM card to access a cellular network—although it should be appreciated that the term "GSM" is used by way of illustration and is not intended to limit embodiments of the present disclosure to the GSM standard.

In an exemplary embodiment, the message sent by the communication circuit may uniquely identify the device from which the message was sent.

In an exemplary embodiment, the processor may be configured to disable the modem while an alarm condition is not detected. In doing so, power consumption of the device may be reduced in order to preserve battery life.

In an exemplary embodiment, the processor may be configured to enable the modem and send status messages at predetermined instances when an alarm condition is not detected. For example, the processor may be configured to issue a status message at predetermined dates or times in order to confirm that it is operational.

In an exemplary embodiment, the processor may be configured to enable the modem and listen for command messages at predetermined instances. The command messages may, for example, be used to adjust the predetermined threshold. For example, the processor may be configured to listen for command messages for a predetermined period of time following sending an alert message. In another exemplary embodiment, the processor may be configured to enable the modem and listen for commands at a predetermined date/and or time.

In an exemplary embodiment, a central controller may be provided for communicating with the device. For example, the central controller may be configured to issue command messages to individual devices in order to adjust configuration settings such as the predetermined threshold. This may be, for example, in response to receiving a predetermined number of alerts subsequently designated as being false negatives.

For a firmware and/or software (also known as a computer program) implementation, the techniques of the present disclosure may be implemented as instructions (for example, procedures, functions, and so on) that perform the functions described. It should be appreciated that the present disclosure is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor.

A general purpose processor may be a microprocessor, but in the alternative, the processor may be any suitable processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers and network connections as known in the art.

The steps of a method, process, or algorithm described in connection with the present disclosure may be embodied directly in hardware, in a software module executed by one or more processors, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Aspects of the present technology are particularly suited to the detection of conditions indicative of the use and/or manufacture of methamphetamine hydrochloride—colloquially known as methamphetamine, which may be referred to herein as "meth"- and examples of the present technology may be described in this context. However, it should be appreciated that the present technology may be applied to the detection of other illicit drugs.

Figure 1:
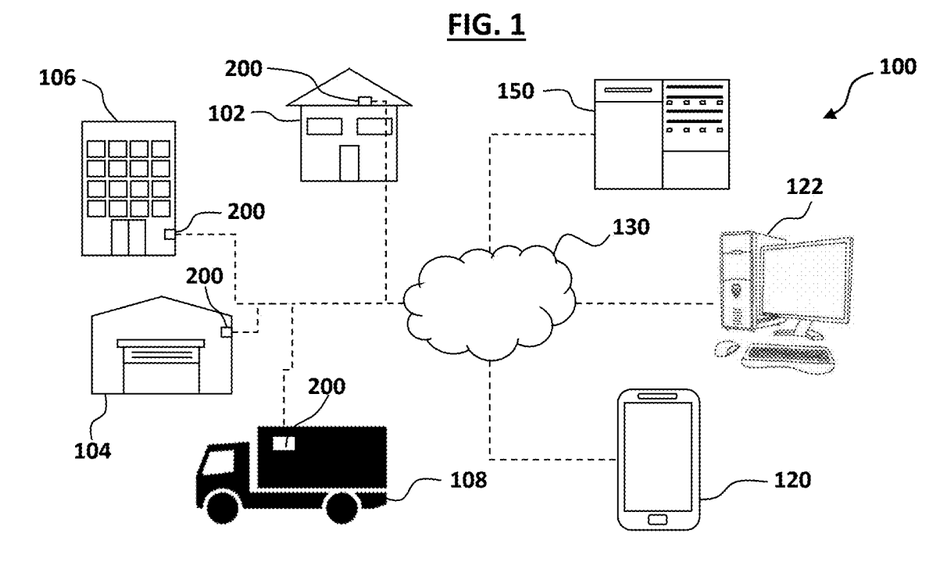
FIG. 1 illustrates an exemplary system in accordance with one aspect of the present technology.

FIG. 1 illustrates an exemplary embodiment of a system 100 within which the present disclosure may operate. Within the system, detector devices 200 configured to detect conditions indicative of illicit drug production and/or use are installed in various locations such as private residences 102, commercial buildings 104, public buildings 106, or vehicles 108, and communicate with user devices (for example mobile phone 120, or computer 122) over a cellular network 130. It should be appreciated that reference to cellular network 130 is not intended to limit communication to cellular communication enabled devices, but that communications may be delivered over a variety of networks interfacing with the cellular network 130.

Those communications may comprise status messages from the detector devices 200—comprising alert messages regarding the detection of conditions indicative of illicit drug production and/or use, and operational messages regarding the current operational status of the device 200—and command messages to reconfigure the detector devices 200.

In an exemplary embodiment, the system 100 may comprise a remote command center 150, for example a server device or cloud computing platform, which may be used to monitor communications to and from the devices 200 and potentially issue command messages to the devices 200 rather than these issuing directly from the user devices 120/122. For example, the command center 150 may determine that alert messages issued by one of the devices 200 are false negatives (whether on analysis of the messages or on instruction of a user), and issue a command message to that device 200 to adjust the settings of that device 200. It is also envisaged that in exemplary embodiments the command center 150 may act as an intermediary between the devices 200 and the user devices 120/122, rather than allowing direct communication.

Figure 2:
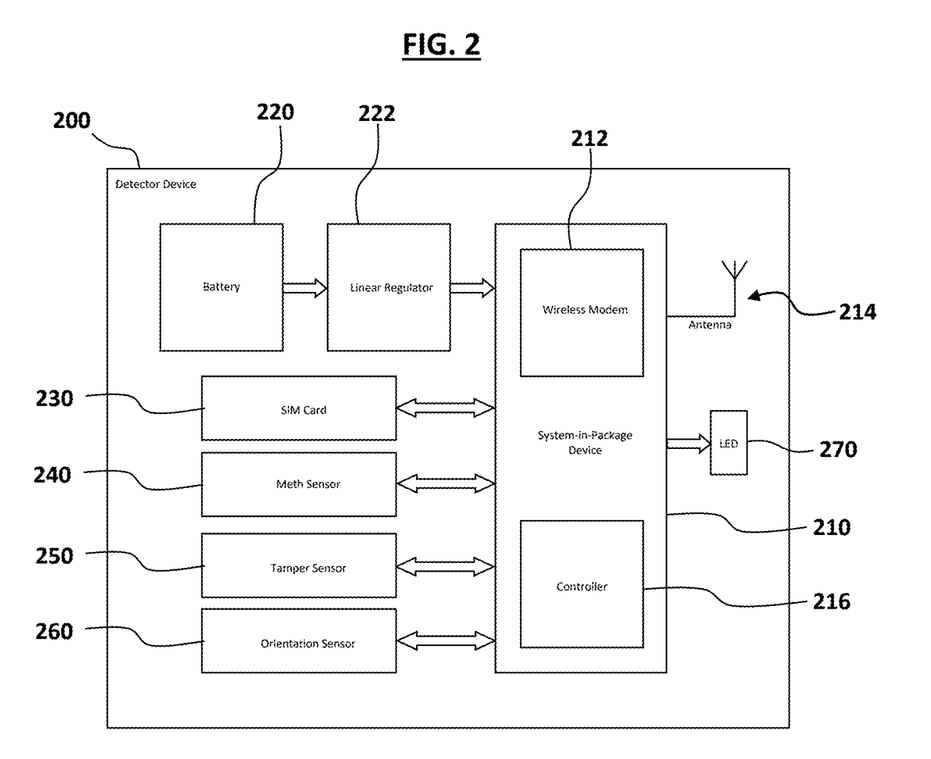
FIG. 2 is a schematic diagram of an exemplary detection device in accordance with one aspect of the present technology.

FIG. 2 illustrates an exemplary meth detection device 200. In the illustrated example the meth detection device 200 comprises a system-in-package (SiP) device 210. The SiP device 210 may comprise any SiP device known in the art such as, but not limited to, a Nordic Semiconductor nRF9160. In examples, the SiP device 210 comprises a wireless modem 212 connected to antenna 214 and configured to provide cellular connectivity— for example, Low Power Wide Area Network (LPWAN) connectivity. For example, the wireless modem may be a LTE-M/NB-IOT modem configured to provide LTE-M/NB-IOT connectivity (although it is noted that other wireless communication technologies are contemplated).

In examples, the SiP device 210 comprises a controller 216. For example, the SiP device 210 may comprise a microcontroller unit (MCU). In examples, the controller is communicatively coupled to the server via network. In examples, controller comprises one or more processors and memory. The controller may comprise any processor known in the art comprising, but not limited to, a microprocessor. The controller may comprise any memory known in the art comprising, but not limited to, a flash memory or random-access memory (RAM). Therefore, the above description should not be interpreted as a limitation on the scope of the present disclosure but merely an illustration.

In examples, the meth detection device 200 comprises a self-contained power source, for example battery 220, and linear regulator 222. In examples, the one or more processors of the SiP device 210 are configured to communicate with at least one SIM card 230 (e.g., received within a SIM card slot, or an eSIM card).

In examples, the meth detection device 200 comprises a "meth" sensor 240 in communication with the SiP device 210. In examples, the meth sensor 240 may be a semiconductor type sensor, and more particularly a metal oxide sensor. For example, the metal oxide sensor may be a tin oxide ethanol sensor. By way of example, the meth sensor 240 may be a MQ303B sensor (e.g., as manufactured by Zhengzhou Winsen Electronics Technology Co., Ltd). In examples, during production of the device 200 long-term preheating of the meth sensor 240 may be performed, e.g., in the order of 72 hours. In examples, during installation of a device 200 a shorter-term preheating of the meth sensor 240 may be performed— for example, in the order of 3 minutes.

In examples, the meth detection device 200 comprises a tamper sensor 250 in communication with the SiP device 210, configured to output a signal indicative of the meth detection device 200— for example, movement of the device 200 from its installed location, or opening of the housing. In an example the tamper sensor 250 may comprise a tactile switch, configured to close when the device 200 is installed against a surface, and open when the device 200 is moved from that surface. In examples the meth detection device 200 comprises an orientation sensor 260 (e.g., an accelerometer or tilt sensor) in communication with the SiP device 210. The output of the orientation sensor 260 may be used as a secondary means of detecting unauthorized movement of the meth detection device 200. In examples, a local indicator 270 (e.g., one or more LEDs) may be provided to provide local feedback regarding operational status.

Figure 3A:
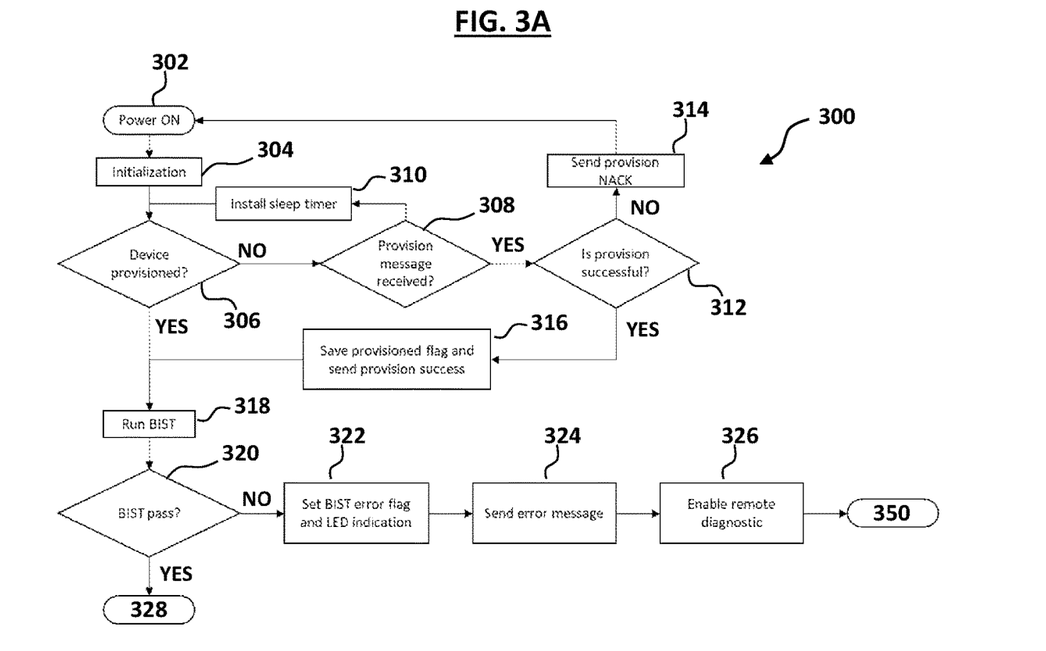
FIG. 3A to FIG. 3C are flow diagrams illustrating an exemplary method of operating the detection device.
Figure 3B:
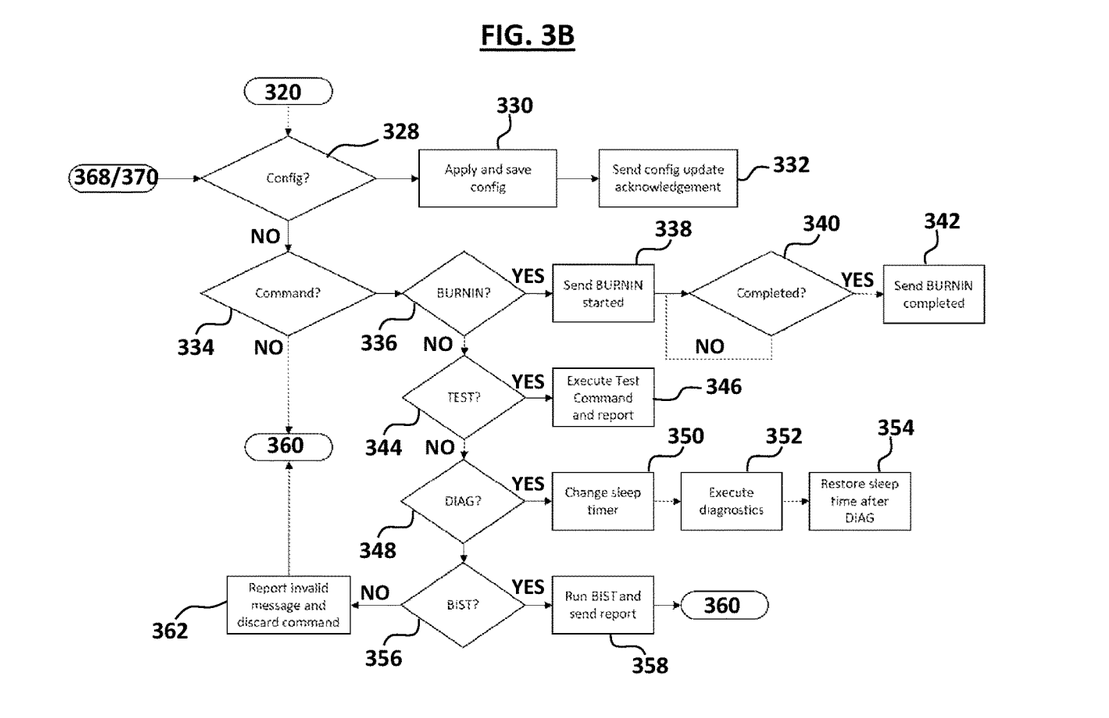
Figure 3C:
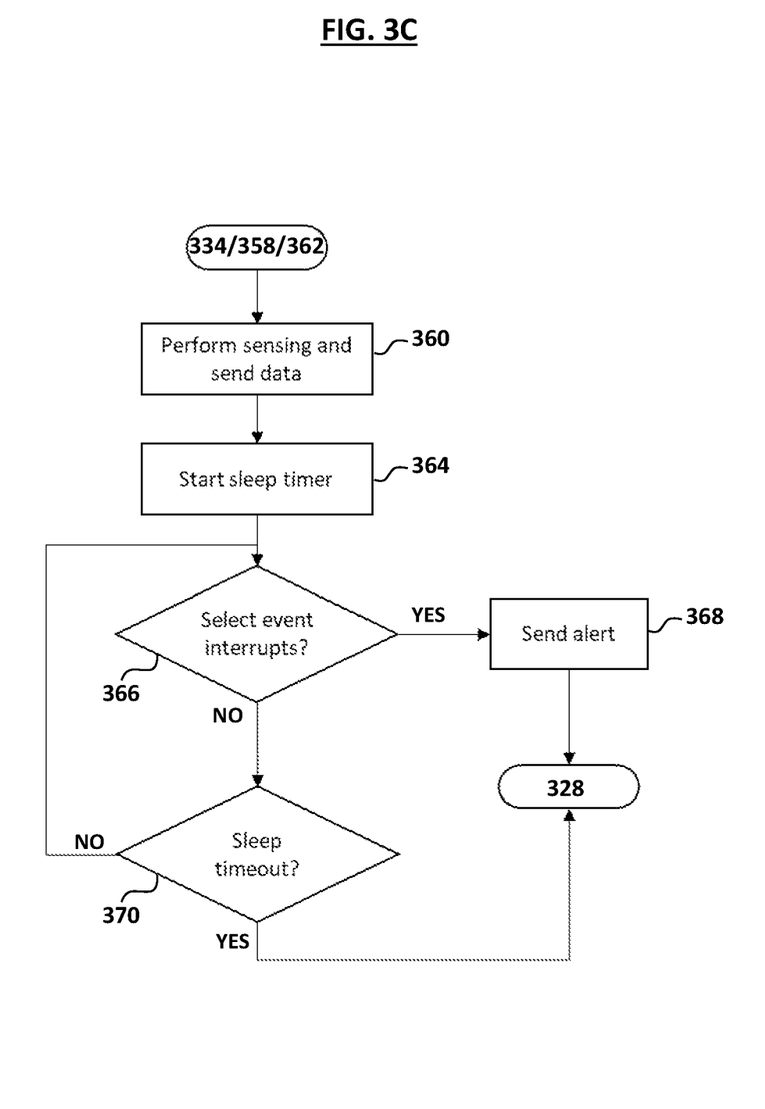

FIG. 3A to FIG. 3C illustrate an exemplary method 300 of operating the meth detection device 200 within the system 100. In step 302 the device 200 is powered on, and in step 304 initialization of the device 200 is performed: the LED 270 indicating power is turned on, the SiP device 210 boots up, sensor and network initialization is performed, and calibrated data is loaded. In step 306 a check is performed as to whether the device 200 has been provisioned (i.e., has been installed and connected to the wider system 100). If not, in step 308 a check is performed to see if a provisioning message has been received, for example from remote command center 150. If such a message has not been received, in step 310 a sleep cycle (for example, 30 minutes) is initiated and on wake-up the method returns to step 306. If the provision message is received, in step 312 a check is performed as to whether the provision was a success. If not, in step 314 a negative acknowledgement is transmitted to remote command center 150 and the device resets to step 302. If the provision was successful, in step 316 a provisioned flag is set and a success message is sent.

Once the provision check is successful, in step 318 a built-in self-test (BIST) is run, and in step 320 a check is performed as to whether the BIST was successful. If not, in step 322 a BIST error flag is set, and LED 270 controlled to indicate an error. In step 324 an error message is sent, and in step 326 remote diagnostics is enabled.

If the BIST was successful, in step 328 a check is performed as to whether any configuration updates are available. If yes, in step 330 the configuration updates are applied and save, and in step 332 an acknowledgement of the configuration being updated is sent to the remote command center 150.

In the absence of configuration updates, in step 334 a check is performed as to whether any commands have been set/received. In step 336 a check is performed for a burn-in or preheating command. If yes, in step 338 the pre-heating process is initiated, and in step 340 a check is performed as to whether pre-heating has been completed. Once a predetermined timer expires, in step 342 a preheating confirmation message is sent.

In the absence of a preheating command, in step 344 a check is performed for a test command— and if yes, the test is run in step 346 and results reported. In the absence of a test command, in step 348 a check is performed for a diagnostics command. If yes, the default sleep timer (e.g., 30 minutes) is changed to a lowest value in step 350, the diagnostics are executed in step 354, and on completion of the diagnostics the sleep time is restored in step 354.

In the absence of a diagnostics command, in step 356 a check is performed for a BIST command— and if yes, a BIST is run in step 358 and results reported before proceeding to step 360. In the absence of a BIST command, in step 362 a determination is made that the command was invalid—this is reported and the command is discarded before progressing to step 360.

In step 360, sensing is performed and data is sent to remote command center 150. As part of sensing, a first preheating stage is performed for a first period of time (e.g., 6 seconds) before the sensor reading is made. If any anomaly is detected (i.e., the sensor output indicates the potential presence of meth), a second preheating stage is performed for a second period of time (e.g., 20 seconds) and the sensor value read again. Using this approach, the power demand required by a longer preheating cycle may be avoided unless there is a preliminary indication that a more reliable reading is required.

Once sensing and reporting has been completed, in step 364 the sleep timer is started (e.g., for 30 minutes). During this time the device 200 is in a low-power mode. Select events are monitored in this time— for example, activation of the tamper sensor 250 or orientation sensor 260 or any other indication of the device 200 being manipulated. If one of these select events occurs, an alert is sent is step 368 and the process returns to step 328. Otherwise, once the sleep timer expires in step 370, the process returns to step 328.

Figure 4:
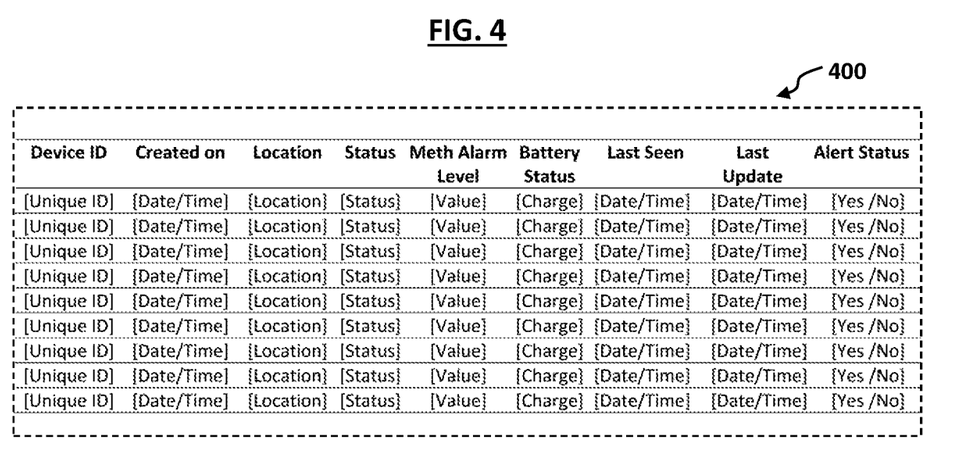
FIG. 4 shows an exemplary dashboard displaying information regarding the status of detection devices associated with a user in accordance with one aspect of the present technology.

FIG. 4 shows an exemplary dashboard 400 accessible by a user, for example via a web application, populated with information from the remote command center 150. In examples the dashboard displays the status of a and the device 200 resets to step plurality of devices 200 associated with the login credentials of a user accessing the dashboard 400. In the example illustrated, the dashboard 400 displays the Unique ID of each device 200, the date on which the entry for each device 200 was created, the location of the device 200, the current status of the device 200 (e.g., active, inactive, failed provisioning, failed deprovisioning), the last meth alarm level, the battery status, the most recent occurrence of the device 200 being detected as having network connection, the last time an update occurred, and a current alert status.

Figure 5:
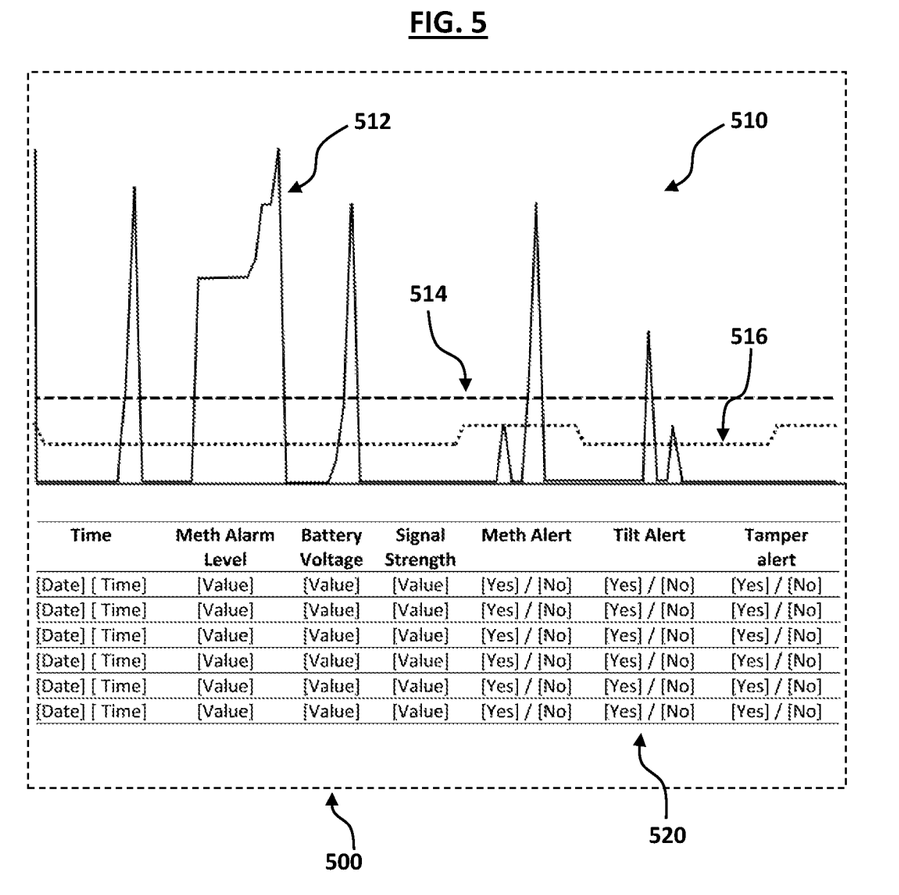
FIG. 5 shows an exemplary reporting interface displaying information regarding the status of a detection device in accordance with one aspect of the present technology.

FIG. 5 shows an exemplary user interface 500 displaying device specific data and information. In this example the user interface 500 includes a visualization in the form of a graph 510 plotting meth sensor readings 512, battery charge 514, and network signal strength 516 over time. A log table 520 provides access to entries over time detailing the alarm level, battery voltage, signal strength, presence of an alert condition, a tilt alert indicator, and a tamper alert indicator.

Figure 6:
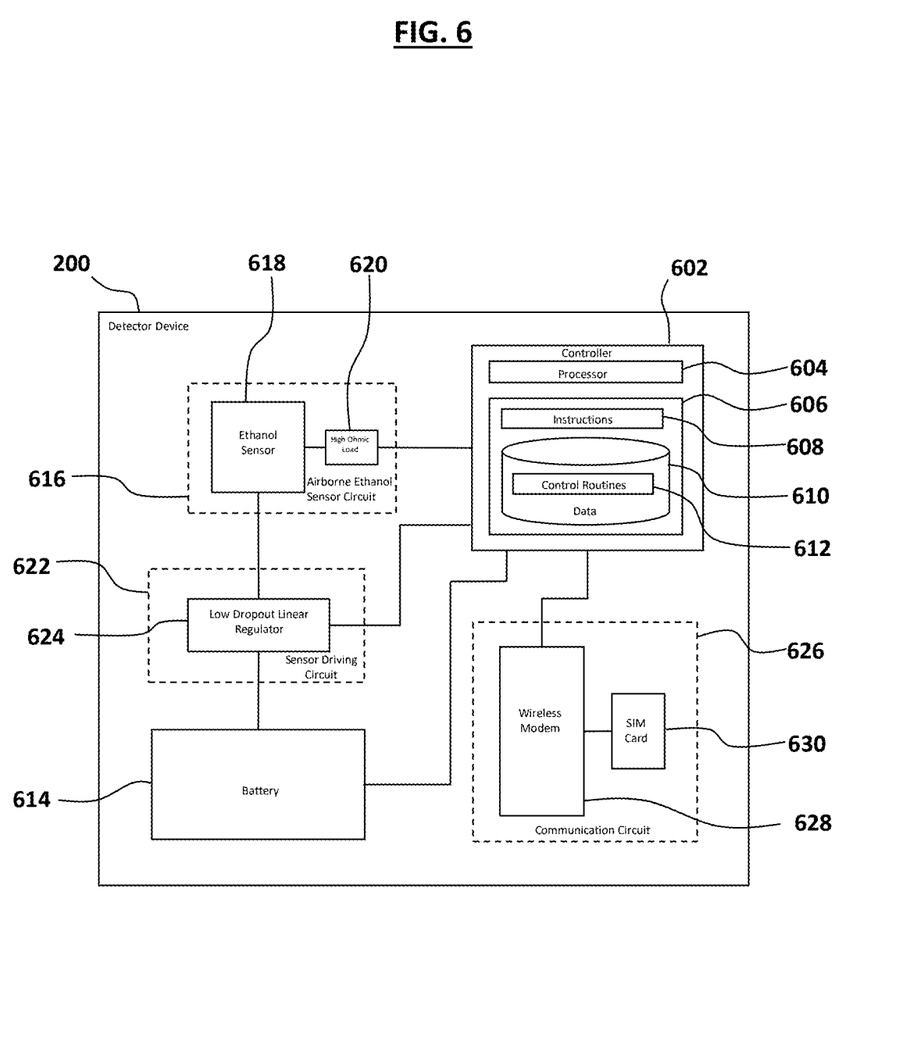
FIG. 6 is a schematic diagram of an exemplary detection device in accordance with one aspect of the present technology.

FIG. 6 illustrates another exemplary device 200 according to aspects of the present technology. In this example, the device 200 comprises a controller 602. In the exemplary embodiment illustrated, the controller 602 has a processor 604, memory 606, and other components typically present in such computing devices. In the exemplary embodiment illustrated the memory 606 stores information accessible by processor 604, the information comprising instructions 608 that may be executed by the processor 604 and data 610 that may be retrieved, manipulated or stored by the processor 604. The memory 606 may be of any suitable means known in the art, capable of storing information in a manner accessible by the processor 604, comprising a computer-readable medium, or other medium that stores data that may be read with the aid of an electronic device.

The processor 604 may be any suitable device known to a person skilled in the art. In an exemplary embodiment, the controller 602 may be a microcontroller, for example the STM8L151F3 microcontroller manufactured by STMicroelectronics. Although the processor 604 and memory 606 are illustrated as being within a single unit, it should be appreciated that this is not intended to be limiting, and that the functionality of each as herein described may be performed by multiple processors and memories, that may or may not be remote from each other.

The instructions 608 may comprise any set of instructions suitable for execution by the processor 604. For example, the instructions 608 may be stored as computer code on the computer-readable medium. The instructions 608 may be stored in any suitable computer language or format.

Data 606 may be retrieved, stored or modified by processor 604 in accordance with the instructions 608. The data 610 may also be formatted in any suitable computer readable format. Again, while the data 610 is illustrated as being contained at a single location, it should be appreciated that this is not intended to be limiting— the data 610 may be stored in multiple memories or locations.

The data 610 stored on server may comprise a record of control routines 612 for the device 200. For example, control routines 612 may be provided for driving an ethanol sensor, reading sensor, and managing communication.

The device 200 comprises a self-contained power source, for example battery 614. The device 200 also has an airborne ethanol sensor circuit 616 comprising an ethanol sensor 618 configured to output a signal indicative of airborne ethanol concentration. In an exemplary embodiment, the ethanol sensor 618 may be a metal oxide ethanol sensor. For example, the metal oxide ethanol sensor may be a tin oxide ethanol sensor— an example of which is the MQ3 gas ethanol sensor (manufactured by Hanwei Electronics Co. Ltd). The airborne ethanol sensor circuit 616 also comprises a high ohmic load 620 (for example a 10 kΩ resistor) on the output of the sensor 618 to the controller 602.

The ethanol sensor 618 is driven by a sensor driving circuit 622 comprising a Low Dropout (LDO) linear regulator 624 (for example the MCP1726 manufactured by Microchip Technology Inc.). The regulator 624 is controlled by the controller 602 to deliver a pulse power up voltage to the ethanol sensor 618 to heat the sensor 618 prior to a reading of the sensor 618 being taken by the controller 602.

The device 200 also comprises a communication circuit 626 comprising a wireless modem 628 configured to communicate over a cellular network 130, and coupled to a SIM card 630.

Figure 7:
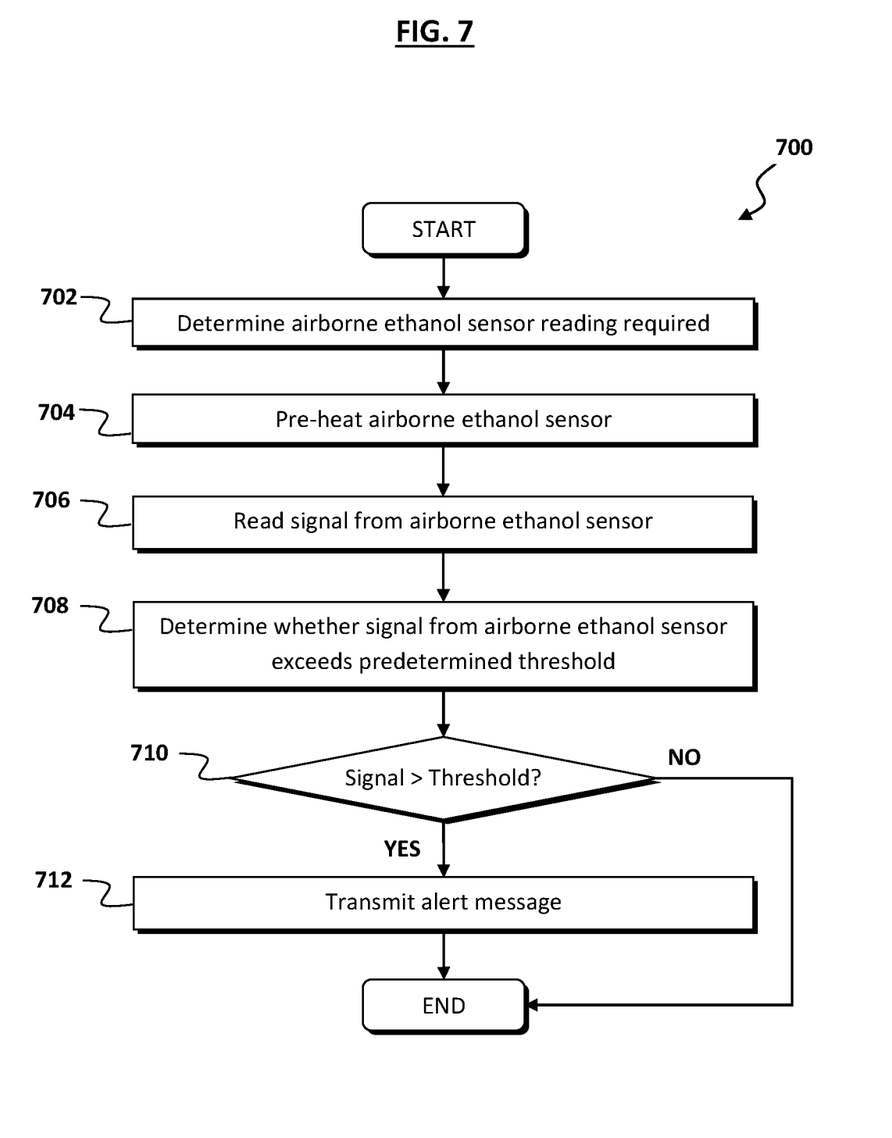
FIG. 7 is a flow diagram illustrating an exemplary method of operating the detection device.

Referring to FIG. 7, a method 700 of operating the device 200 is illustrated. In a first step 702, the controller 602 determines that the sensor 618 is to be read—for example on a predetermined period of time lapsing following a previous reading. In a second step 704 the processor controls the sensor driving circuit 622 to preheat the sensor 618 prior to taking a reading.

In a third step 706 the controller 602 reads the output value of the sensor 618 and converts it to an ADC value indicative of the current airborne ethanol concentration at the sensor 618. In fourth step 708 the controller 602 compares the sensor ADC value against a predetermined threshold value—for example one indicative of the airborne ethanol concentration being about 75 ppm. Ethanol is used in significant quantities in the manufacture of many illicit drugs, comprising methamphetamine, and as such it is envisaged that detection of may be used as a reliable indicator of the early stages of a clandestine drug laboratory operating in the premises in which the device is installed— or at least activity within the premises requiring investigation by the property owner or manager. It is envisaged that this threshold may avoid triggering of an alert in common household activity such as cleaning using rubbing alcohol or drinking alcohol consumption.

The controller 602 determines whether the predetermined threshold is exceeded in step 710, and if not, returns to a sleep state (depowering the sensor 618 and resetting the clock until the next reading is required). If the predetermined threshold is exceeded in step 310, an alert message is issued in step 712 to the user device 120/122 associated with that particular detection device 200.

Figure 8:
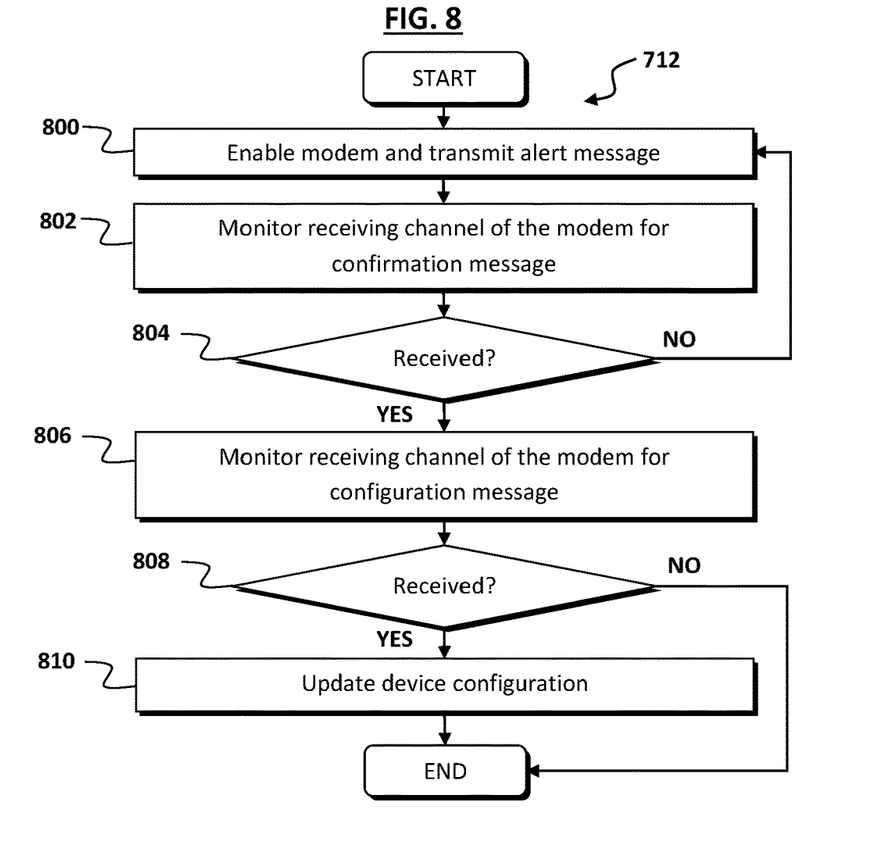
FIG. 8 is a flow diagram illustrating a sub-process in the method of operating the detection device.

FIG. 8 illustrates an exemplary sub-process in the sending of the alert message in step 712. In step 800, on determining that the predetermined threshold has been exceeded in step 810, the controller 602 enables the modem 628 to send the alert message. In an exemplary embodiment, the controller 602 may be configured to monitor a receiving channel of the modem 628 for a predetermined period of time following issuance of the alert message. For example, in step 802 the controller 602 may monitor for a confirmation message from the user device 120/122 or the command centre device 150, and on determining in step 804 that a confirmation message is not received, return to step 800 and reissue the alert message.

In an exemplary embodiment, in step 806 the controller 602 may also monitor for a configuration message to adjust a configuration of the device 200, for example the predetermined threshold. On determining that a configuration message has been received in step 808, the controller 602 updates the device configuration in accordance with the configuration message in step 810.

It should be appreciated that in exemplary embodiments the step of sending of the alert message may comprise one, both, or neither of the steps of monitoring for the confirmation message and the configuration message. Further, it is contemplated that in exemplary embodiments a single message may comprise confirmation data and configuration data, and it should be appreciated that reference to the receiving of distinct messages is not intended to be limiting to all exemplary embodiments.

Once the controller 602 has determined that the alert message has been transmitted (and in exemplary embodiments has monitored for received messages), disables the modem 628 in order to preserve battery life.

Figure 9:
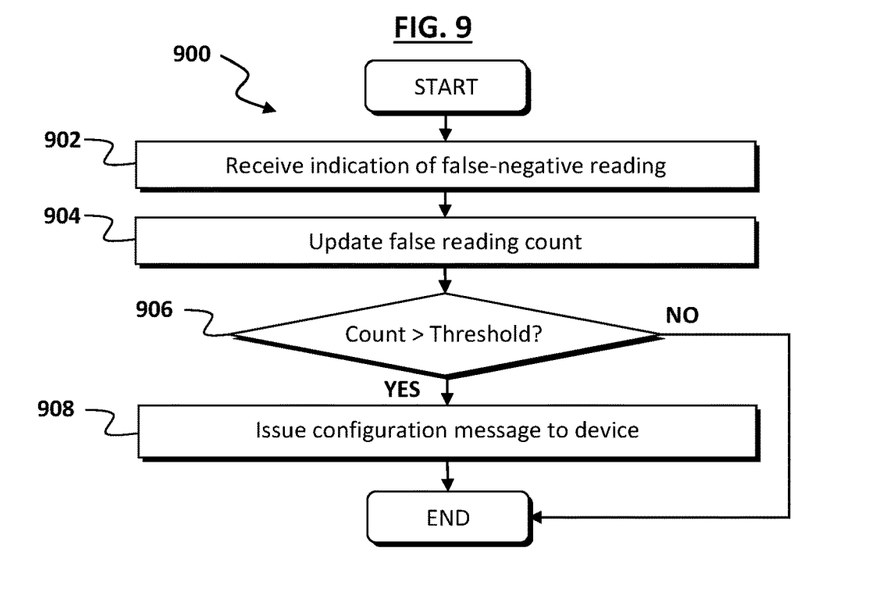
FIG. 9 is a flow diagram illustrating a method of configuring the detection device.

FIG. 9 illustrates a method 900 of issuing a configuration message. In step 902, an indication of a false-negative reading is received— for example at an application of the user device 120/122, or the command centre device 150. For example, a false-negative reading may be registered by a user responding to an alert message and discovering no cause for issuance of the alert. In step 904 a count of false-negative readings is recorded, and in step 906 the count is compared with a predetermined threshold. If the predetermined threshold is not exceeded, no further action is taken.

If the predetermined threshold is exceeded, in step 908 a configuration message is issued to the device 200, for example increasing the predetermined threshold value for the sensor ADC value. At this point, the false-negative count may be reset, or reduced.

By detecting airborne ethanol in the concentrations described, it is envisaged that conditions associated with the early stages of illicit drug production, more particularly methamphetamine, may be determined before a property becomes contaminated— or at least potentially reduce the extent of contamination. The various exemplary features of the detector device described herein may assist with achieving a small physical footprint enabling the device to be installed in discreet and difficult to detect (or access) locations. Further, the various exemplary features of the detector device described herein may assist with achieving a relatively low power consumption while maintaining this small footprint.

For a firmware and/or software (also known as a computer program) implementation, the techniques of the present disclosure may be implemented as instructions (for example, procedures, functions, and so on) that perform the functions described. It should be appreciated that the present disclosure is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor. A general purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers, whether cloud based or dedicated, and network connections as known in the art.

In various embodiments, one or more cloud computing environments may be used to create, and/or deploy, and/or operate at least part of the software system that can be any form of cloud computing environment, for example: a public cloud, a private cloud, a virtual private network (VPN), a subnet, a Virtual Private Cloud (VPC), or any other cloud-based infrastructure known in the art. It should be appreciated that a service may utilize, and interface with, multiple cloud computing environments.

The steps of a method, process, or algorithm described in connection with the present disclosure may be embodied directly in hardware, in a software module executed by one or more processors, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The illustrated embodiments of the disclosure will be best understood by reference to the figures. The foregoing description is intended only by way of example and simply illustrates certain selected exemplary embodiments of the disclosure. It should be noted that the flowchart and block diagrams in the figures illustrate the architecture, functionality, and operation of possible implementations of systems, apparatuses, methods and computer program products according to various embodiments of the disclosure. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The entire disclosures of all applications, patents and publications cited above and below, if any, are herein incorporated by reference. Reference to any prior art in this specification is not, and should not be taken as, an acknowledgement or any form of suggestion that that prior art forms part of the common general knowledge in the field of endeavour in any country in the world.

The invention(s) of the present disclosure may also be said broadly to consist in the parts, elements and features referred to or indicated in the specification of the application, individually or collectively, in any or all combinations of two or more of said parts, elements or features. Where in the foregoing description reference has been made to integers or components having known equivalents thereof, those integers are herein incorporated as if individually set forth.

Furthermore, the described features, structures, or characteristics may be combined in any suitable manner in at least one embodiment. In the foregoing description, numerous specific details are provided to give a thorough understanding of the exemplary embodiments. One skilled in the relevant art may well recognize, however, that embodiments of the disclosure can be practiced without at least one of the specific details thereof, or can be practiced with other methods, components, materials, et cetera. In other instances, well-known structures, materials, or operations are not shown or described in detail to avoid obscuring aspects of the invention.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps, that is to say, in the sense of "including, but not limited to".

Aspects of the present disclosure have been described by way of example only and it should be appreciated that modifications and additions may be made thereto without departing from the scope thereof.

The invention claimed is:

1. A device for a detection of conditions indicative of production and/or use of methamphetamine hydrochloride, comprising:
a self-contained power source;
an airborne sensor configured to output a signal indicative of a presence of the methamphetamine hydrochloride;
at least one processor, configured to:
maintain the device in a low power sleep mode until a predetermined time condition is met;
preheat the airborne sensor for a first period of time and monitor the signal that is output by the airborne sensor;
preheat the airborne sensor for a second period of time on determining that the signal that is output by the airborne sensor meets a predetermined threshold,
wherein the second period of time is longer than the first period of time, and monitor the signal that is output by the airborne sensor;
on determining that the signal that is output by the airborne sensor meets the predetermined threshold following the preheating of the airborne sensor for the second period of time, transmit an alert to a remote location; and
wherein at least one interference sensor configured to output a first signal indicative of physical interference with the device, wherein the at least one processor is configured to interrupt the low power sleep mode on receiving the first signal indicative of the physical interference with the device from the at least one interference sensor.

2. The device of claim 1, wherein the airborne sensor comprises a semiconductor type airborne sensor.

3. The device of claim 2, wherein the airborne sensor is a metal oxide type airborne sensor.

4. The device of claim 1, wherein the first period of time is between 5 seconds and 10 seconds.

5. The device of claim 1, wherein the first period of time is 6 seconds.

6. The device of claim 1, wherein the second period of time is greater than 10 seconds.

7. The device of claim 1, wherein the second period of time is 20 seconds.

8. The device of claim 1, wherein the at least one processor is configured to perform an installation heating of the airborne sensor for a period of time greater than two minutes and less than 5 minutes.

9. The device of claim 1, wherein the device further comprises a wireless modem configured to communicate over a cellular network.

10. The device of claim 9, wherein the device further comprises a multi-carrier Subscriber Identity Module (SIM), and the at least one processor is configured to perform dynamic identification and locking of a designated cellular network.

11. The device of claim 1, wherein the at least one processor is configured to listen for command messages once the predetermined time condition is met.

12. A system for a monitoring and reporting of conditions indicative of production and/or use of methamphetamine hydrochloride, comprising:
a device; and
a remote computing resource configured to be in communication with the device, wherein the remote computing resource is further configured to deliver alert messages, and/or enable access to a user interface displaying historical information relating to operation of the device, to at least one user,
wherein the device comprising:
a self-contained power source;
an airborne sensor configured to output a signal indicative of a presence of the methamphetamine hydrochloride;
at least one processor, configured to:
maintain the device in a low power sleep mode until a predetermined time condition is met;
preheat the airborne sensor for a first period of time and monitor the signal that is output by the airborne sensor;
preheat the airborne sensor for a second period of time on determining that the signal that is output by the airborne sensor meets a predetermined threshold,
wherein the second period of time is longer than the first period of time, and monitor the signal that is output by the airborne sensor;
on determining that the signal that is output by the airborne sensor meets the predetermined threshold following the preheating of the airborne sensor for the second period of time, transmit an alert to a remote location; and
wherein at least one interference sensor configured to output a first signal indicative of physical interference with the device, wherein the at least one processor is configured to interrupt the low power sleep mode on receiving the first signal indicative of the physical interference with the device from the at least one interference sensor.

13. A method for a detection of conditions indicative of production and/or use of methamphetamine hydrochloride, comprising:
maintaining a device comprising a self-contained power source and an airborne sensor configured to output a signal indicative of a presence of the methamphetamine hydrochloride in a low power sleep mode until a predetermined time condition is met a the self-contained power source;
preheating the airborne sensor for a first period of time and monitoring the signal that is output by the airborne sensor;
preheating the airborne sensor for a second period of time on determining that the signal that is output by the airborne sensor meets a predetermined threshold,
wherein the second period of time is longer than the first period of time, and monitoring the signal that is output by the airborne sensor,
transmitting an alert to a remote location on determining that the signal that is output by the airborne sensor meets the predetermined threshold following the preheating for the second period of time; and
wherein at least one interference sensor configured to output a first signal indicative of physical interference with the device, wherein the device comprising a processor configured to interrupt the low power sleep mode on receiving the first signal indicative of the physical interference with the device from the at least one interference sensor.

14. The method of claim 13, wherein the first period of time is between 5 seconds and 10 seconds.

15. The method of claim 13, wherein the first period of time is 6 seconds.

16. The method of claim 13, wherein the second period of time is greater than 10 seconds.

17. The method of claim 13, wherein the second period of time is 20 seconds.

* * * * *